United States Patent
Hsu et al.

(10) Patent No.: US 11,092,840 B2
(45) Date of Patent: Aug. 17, 2021

(54) REFLECTIVE PIXEL UNIT, REFLECTIVE DISPLAY PANEL AND DISPLAY APPARATUS

(71) Applicants: BOE OPTICAL SCIENCE AND TECHNOLOGY CO., LTD., Jiangsu (CN); BOE TECHNOLOGY GROUP CO., LTD., Beijing (CN)

(72) Inventors: Hunghuei Hsu, Beijing (CN); Xiuhe Zhou, Beijing (CN)

(73) Assignees: BOE OPTICAL SCIENCE AND TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/643,212

(22) PCT Filed: Apr. 17, 2019

(86) PCT No.: PCT/CN2019/083103
§ 371 (c)(1),
(2) Date: Feb. 28, 2020

(87) PCT Pub. No.: WO2019/206013
PCT Pub. Date: Oct. 31, 2019

(65) Prior Publication Data
US 2020/0209678 A1 Jul. 2, 2020

(30) Foreign Application Priority Data
Apr. 25, 2018 (CN) .......................... 201820603326.7

(51) Int. Cl.
*G02F 1/1335* (2006.01)

(52) U.S. Cl.
CPC .. *G02F 1/133514* (2013.01); *G02F 1/133504* (2013.01); *G02F 1/133553* (2013.01); *G02F 2203/02* (2013.01); *G02F 2203/055* (2013.01)

(58) Field of Classification Search
CPC ......... G02F 1/133514; G02F 1/133504; G02F 1/133553; G02F 2203/02; G02F 2203/055
(Continued)

(56) References Cited

U.S. PATENT DOCUMENTS 6,233,029 B1    5/2001   Iijima et al.
6,693,688 B1 *  2/2004   Hisatake ............. G02F 1/13362
                                                       349/113
(Continued)

FOREIGN PATENT DOCUMENTS

CN        1175704 A       3/1998
CN      101303468 A      11/2008
(Continued)

OTHER PUBLICATIONS

International Search Report received for PCT Patent Application No. PCT/CN2019/083103, dated Jul. 8, 2019, 6 pages (2 pages of English Translation and 4 pages of Original Document).
(Continued)

*Primary Examiner* — Nathanael R Briggs
*Assistant Examiner* — William D Peterson
(74) *Attorney, Agent, or Firm* — Womble Bond Dickinson (US) LLP

(57) ABSTRACT

A reflective pixel unit, a reflective display panel and a display apparatus are disclosed. The reflective pixel unit includes a substrate, a reflective plate on the substrate, and a reflective filter layer on a side of the reflective plate facing away from the substrate. The reflective filter layer is configured such that a surface of the reflective filter layer facing away from the reflective plate receives visible light and reflects a part of light having wavelengths within a specific range in the visible light, and allows another part of the light having wavelengths within the specific range to pass through the reflective filter layer to the reflective plate. The reflective (Continued)

plate is configured to reflect the another part of the light having wavelengths within the specific range passed through the reflective filter layer.

17 Claims, 2 Drawing Sheets

(58) Field of Classification Search
USPC .......................................................... 349/106
See application file for complete search history.

(56) References Cited

U.S. PATENT DOCUMENTS

2008/0259459 A1* 10/2008 Wang ....................... G02B 5/26
359/588
2020/0209678 A1 7/2020 Hsu et al.

FOREIGN PATENT DOCUMENTS

| CN | 208477259 U | 2/2019 |
|----|-------------|--------|
| JP | 2006-221050 A | 8/2006 |

OTHER PUBLICATIONS

Office Action received for Chinese Patent Application No. 201820603326.7, dated Oct. 9, 2018, 4 pages (2 pages of English Translation and 2 pages of Office Action).

\* cited by examiner

US 11,092,840 B2

REFLECTIVE PIXEL UNIT, REFLECTIVE DISPLAY PANEL AND DISPLAY APPARATUS

RELATED APPLICATIONS

This application is a 35 U.S.C. 371 national stage application of PCT International Application No. PCT/CN2019/083103, filed on Apr. 17, 2019, which claims priority to Chinese Patent Application No. 201820603326.7 filed on Apr. 25, 2018, the entire disclosures of which are hereby incorporated by reference.

TECHNICAL FIELD

The present disclosure relates to the field of display technologies, and in particular, to a reflective pixel unit, a reflective display panel and a display apparatus.

BACKGROUND

At present, in order to display a color image, a general reflective display screen may use a color filter to filter white light, absorb unwanted wavelengths, and allow required wavelengths to pass through, thereby rendering expected colors. The brightness of the light is, however, greatly reduced after passing through the color filter, resulting in a relatively dark picture.

SUMMARY

According to an aspect of the present disclosure, a reflective pixel unit is provided, comprising a substrate, a reflective plate on the substrate, and a reflective filter layer on a side of the reflective plate facing away from the substrate. The reflective filter layer is configured such that a surface of the reflective filter layer facing away from the reflective plate receives visible light and reflects a part of light having wavelengths within a specific range in the visible light, and allows another part of the light having wavelengths within the specific range to pass through the reflective filter layer to the reflective plate. The reflective plate is configured to reflect the another part of the light having wavelengths within the specific range that has passed through the reflective filter layer.

In some embodiments, the reflective filter layer comprises a scattering element.

In some embodiments, the scattering element comprises the surface of the reflective filter layer facing away from the reflective plate. The surface of the reflective filter layer facing away from the reflective plate comprises protrusions and recesses.

In some embodiments, a plurality of the protrusions have a plurality of sizes, and/or a plurality of the recesses have a plurality of sizes.

In some embodiments, the scattering element comprises a scattering particle in the reflective filter layer.

In some embodiments, at least a part of a plurality of the scattering particles protrudes from the surface of the reflective filter layer facing away from the reflective plate.

In some embodiments, a refractive index of the scattering particle is different from a refractive index of the reflective filter layer.

In some embodiments, the scattering particles comprise at least one of a sphere particle, an ellipsoid particle, or a polyhedron particle.

In some embodiments, a range of wavelengths transmittable through the scattering particles is same as a range of wavelengths transmittable through the reflective filter layer.

In some embodiments, any wavelength within a visible light range is transmittable through the scattering particle.

In some embodiments, the scattering particles comprise a first scattering particle and a second scattering particle. A range of wavelengths transmittable through the first scattering particles is same as a range of wavelengths transmittable through the reflective filter layer. Any wavelength within a visible light range is transmittable through the second scattering particle.

In some embodiments, a plurality of the scattering particles comprise a plurality of sizes.

In some embodiments, the reflective pixel unit further comprises a counter substrate on a side of the reflective filter layer facing away from the substrate, and a liquid crystal layer between the counter substrate and the reflective filter layer.

According to another aspect of the present disclosure, a reflective display panel is provided comprising the reflective pixel unit according to embodiments of the present disclosure.

In some embodiments, a plurality of the reflective filter layers of a plurality of the reflection pixel units comprise a red reflective filter layer, a blue reflective filter layer, and a green reflective filter layer, respectively, or a plurality of the reflective filter layers of a plurality of the reflection pixel units comprise a red reflective filter layer, a blue reflective filter layer, a green reflective filter layer, and a white reflective filter layer, respectively, or a plurality of the reflective filter layers of a plurality of the reflection pixel units comprise a red reflective filter layer, a blue reflective filter layer, a green reflective filter layer, and a yellow reflective filter layer, respectively, or a plurality of the reflective filter layers of a plurality of the reflection pixel units comprise a magenta reflective filter layer, a cyan reflective filter layer, and a yellow reflective filter layer, respectively, or a plurality of the reflective filter layers of a plurality of the reflection pixel units comprise a magenta reflective filter layer, a cyan reflective filter layer, a yellow reflective filter layer, and a white reflective filter layer, respectively.

According to yet another aspect of the present disclosure, a display apparatus is provided comprising the reflective display panel according to embodiments of the present disclosure.

BRIEF DESCRIPTION OF THE DRAWINGS

Embodiments of the present disclosure are described in more detail and by way of non-limiting examples with reference to the accompanying drawings, in which.

DETAILED DESCRIPTION

Figure 1:
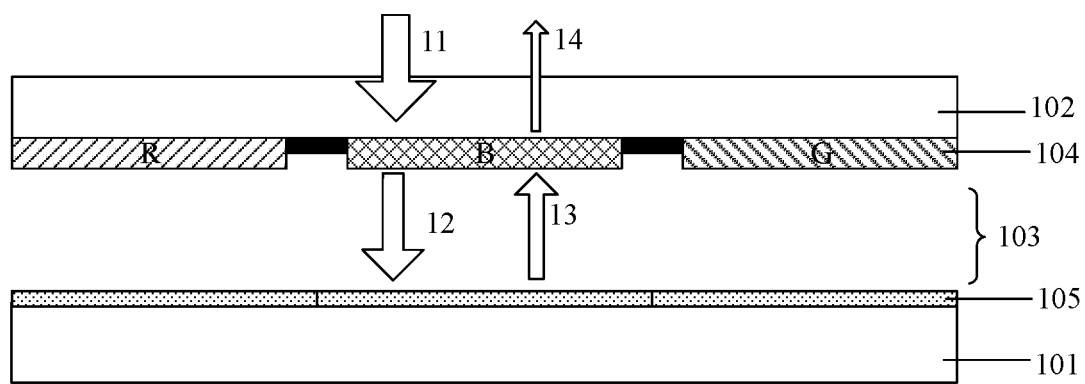
FIG. 1 schematically illustrates a structure of a reflective pixel unit in the related art.

In order to make the objectives, technical solutions, and advantages of the present disclosure more clear, the present disclosure will be described in further detail below with reference to the accompanying drawings. It will be apparent that the described embodiments are only a part of the embodiments of the present disclosure, but not all of the embodiments. All other embodiments obtained by a person of ordinary skill in the art, based on the embodiments in the present disclosure, without making inventive efforts, fall within the protection scope of the present disclosure.

The shapes and sizes of the components in the drawings do not reflect the actual scale, and the purpose is only to illustrate the present disclosure.

In order for a conventional reflective display screen to display a color image, a transmissive color filter is generally used at present. The transmissive color filter allows light of a specific wavelength to pass through and absorbs light of other wavelengths, thereby presenting a specific color. However, even if the light of the specific wavelength is transmittable through the transmissive color filter, a part of the light of the specific wavelength is lost during the process of passing through the filter. As a result, after passing through the transmissive color filter, ambient light, which is generally white, is reduced in brightness by approximately 70%, resulting in a huge loss that makes the display screen dark.

FIG. 1 schematically illustrates a structure of a pixel unit in the related art. As shown in FIG. 1, the pixel unit includes a substrate 101 and a counter substrate 102 opposite to each other. A transmissive filter 104 is disposed on a side of the counter substrate 102 facing the substrate 101. A reflective plate 105 is disposed on a side of the substrate 101 facing the counter substrate 102. A liquid crystal layer 103 is between the substrate 101 and the counter substrate 102, particularly between the transmissive filter 104 and the reflective plate 105. A completed pixel may include multiple pixel units. For example, in an embodiment, the pixel includes three pixel units, and the transmissive filters 104 of the three pixel units may be a red transmissive filter (R), a green transmissive filter (G), and a blue transmissive filter (B), respectively. The red transmissive filter is a filter that allows light in the red wavelength range (e.g., 620 nm to 760 nm) to pass through and prevents light of other wavelengths from passing through. The green transmissive filter is a filter that allows light in the green wavelength range (e.g., 490 nm to 580 nm) to pass through and prevents light of other wavelengths from passing through. The blue transmissive filter is a filter that allows light in the blue wavelength range (e.g., 400 nm to 450 nm) to pass through and prevents light of other wavelengths from passing through.

A change process from the incident light to the exiting light is described below by taking the blue transmissive filter (B) as an example. The ambient light 11 reaches the blue transmissive filter 104 through the counter substrate 102. Thereafter, the ambient light 11 enters the blue transmissive filter. In the filter 104, the light not belong to the blue wavelength range is absorbed by the blue transmissive filter 104, while all light of the wavelength within the blue wavelength range is attenuated when passing through the filter 104, and finally exits from the filter 104 to the reflective plate 105 in the form of primary blue light 12. The primary blue light 12 passes through the liquid crystal layer 103 and reaches the reflective plate 105, then is reflected by the reflective plate 105, and then passes through the liquid crystal layer 103 again and reaches the filter 104 in the form of secondary blue light 13. Thereafter, the secondary blue light 13 is incident on the filter 104. In the filter 104, the secondary blue light 13 is color purified and exits in the form of final blue light 14. The final blue light 14 is observed by human eyes after passing through the counter substrate 102.

It can be known from the above description that in the process of the change from the ambient light 11 to the final blue light 14, the blue light in the ambient light 11 passes through the filter 104 twice. Each time it passes through the filter 104, there is certain attenuation, and the brightness of the final blue light 14 is seriously affected.

Figure 2:
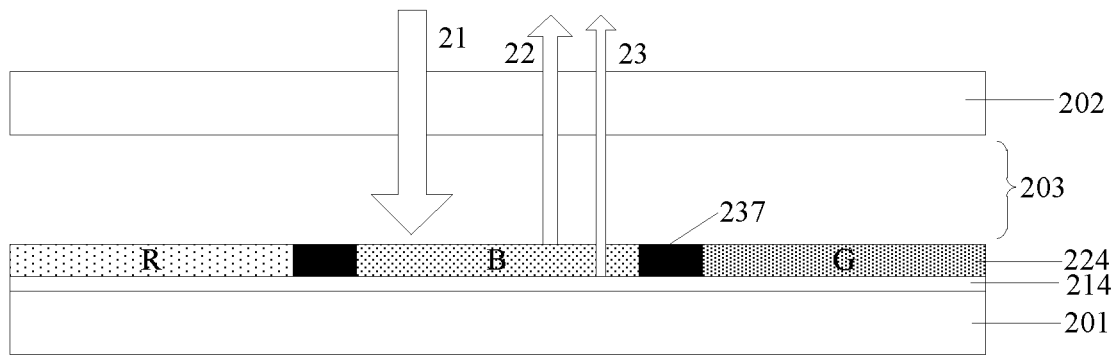
FIG. 2 schematically illustrates a structure of a reflective pixel unit according to an embodiment of the present disclosure.

According to an embodiment of the present disclosure, a reflective pixel unit is provided. FIG. 2 schematically illustrates a structure of a reflective pixel unit according to an embodiment of the present disclosure. As shown in FIG. 2, the reflective pixel unit includes a substrate 201, a reflective plate 214 on the substrate 201, and a reflective filter layer 224 on a side of the reflective plate 214 facing away from the substrate 201. The reflective filter layer 224 is configured such that a surface of the reflective filter layer 224 facing away from the reflective plate 214 receives visible light and reflects a part of the light having wavelengths within a specific range of the visible light, and allows another part of the light having wavelengths within the specific range to pass through the reflective filter layer to arrive at the reflective plate. The reflective plate 214 is configured to reflect said another part of the light having wavelengths within the specific range that has passed through the reflective filter layer 224. The term "reflective filter layer" refers to a layer structure that enable the light exiting from it (including both the light emitted therefrom after being reflected and the light emitted therefrom after passing through it) to have wavelengths in a specific range.

As shown in FIG. 2, the light of wavelength within the specific range in the visible light, that impinges the reflective pixel unit, is not entirely incident into the reflective filter layer 224. A part of the light having wavelengths within the specific range is reflected by the surface of the reflective filter layer 224 facing away from the reflective plate 214, and exits from the reflective filter layer 224 in the form of the first filtered light. That is, this part of light simply experience the reflection of the reflective filter layer 224 before leaving the reflective filter layer 224. Therefore, this part of light does not enter the reflective filter layer 224, and hence will not be attenuated due to passing through the reflective filter layer 224. Another part of the light having wavelengths within the specific range is incident into the reflective filter layer 224 and then reflected by the reflective plate 214, and then passes through the reflective filter layer 224, and exits from the reflective filter layer 224 in the form of the second filtered light. Therefore, less light is attenuated due to the transmission through the reflective filter layer 224, so that the display brightness can be improved.

The process in which the visible light passes through the reflective filter layer 224 to become blue light and exits from the pixel unit is described below by taking the blue reflective filter layer B as an example of the reflective filter layer 224. In the present application, the term "reflective filter layer" preceded by a certain color means that this reflective filter layer allows the light having wavelengths within the range of this color to be reflected and transmitted. For example, the term "blue reflective filter layer" means that when visible light is incident on the blue reflective filter layer, the light having wavelengths within the blue range (e.g., wavelengths in the range of 400 nm to 450 nm) can be reflected by or transmitted through the blue reflective filter, while light of other wavelength ranges is absorbed by the blue reflective filter layer. As shown in FIG. 2, the visible light 21 incidents the reflective filter layer 224 after passing through the counter substrate 202. The visible light 21 includes blue light. A part of the blue light is directly reflected by an upper surface of the reflective filter layer 224 and leaves the reflective filter layer 224 in the form of the first exiting blue light 22. Another part of the blue light enters into and passes through the blue reflective filter layer, and is then reflected by the reflective plate 214 and enters the blue reflective filter layer again, and then leaves the reflective filter layer 224 in the form of the second exiting blue light 23. The light of other colors is absorbed.

Figure 3:
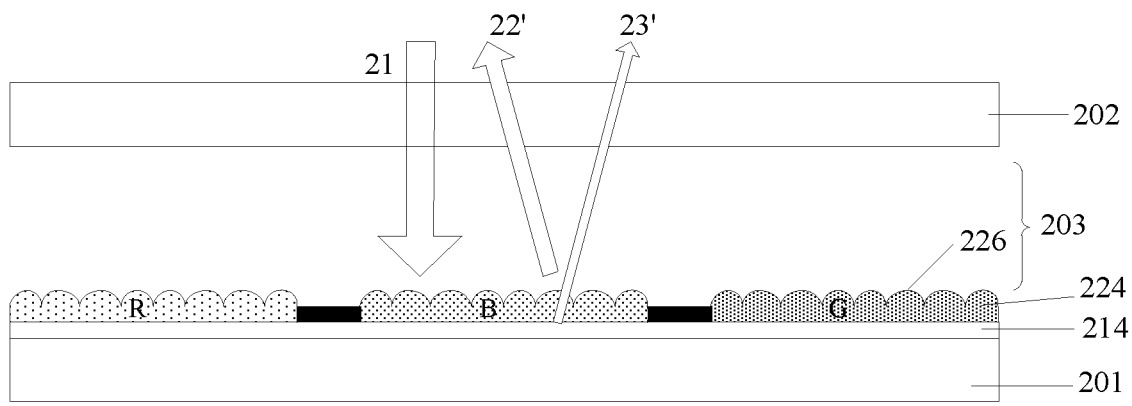
FIG. 3 schematically illustrates a structure of a reflective pixel unit according to another embodiment of the present disclosure.

In some embodiments, the reflective filter layer 224 includes a scattering element 226. FIG. 3 schematically illustrates a structure of a reflective pixel unit according to another embodiment of the present disclosure. As shown in FIG. 3, the scattering element 226 can change the exit angles of the reflected light 22' leaving the surface of the reflective filter layer 224 and the transmitted reflected light 23' transmitted through the reflective filter layer and reflected by the reflective plate 214, thus avoiding the picture quality degradation caused by external light shining directly on the pixel unit, improving picture visibility and human eye observation effect.

In the reflective pixel unit provided by the embodiments of the present disclosure, the scattering element may include multiple implementations.

Figure 4:
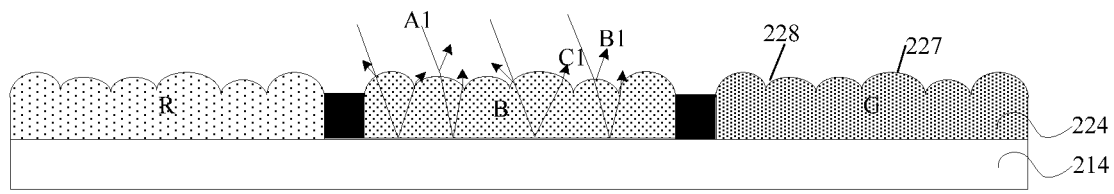
FIG. 4 schematically illustrates a structure of a scattering element according to an embodiment of the present disclosure.

FIG. 4 schematically illustrates a structure of a scattering element according to an embodiment of the present disclosure. As shown in FIG. 4, the scattering element may include a surface of the reflective filter layer 224 facing away from the reflective plate 214 which includes protrusions 227 and recesses 228. That is, the surface of the reflective filter layer 224 facing away from the reflective plate 214 is an uneven surface. The uneven surface can make the exiting light diverge in different directions to achieve the effect of light scattering.

Specifically, description is made by taking the light path of the light exiting from the blue reflective filter layer (B) as an example. After the incident light A1 arriving at the uneven surface of the color reflective filter layer 224, a part of the blue light in the incident light A1 is reflected as the surface reflected light B1, and another part of the blue light is refracted into the blue reflective filter layer at different angles, passes through the blue reflective filter layer 224, reaches the reflective plate 214 and is reflected, and then passes through the blue reflective filter layer 224 again to reach the uneven surface, and exits as blue transmitted reflected light C1. The surface reflected light B1 and the transmitted reflected light C1 constitute the exiting light of the reflective filter layer 224. Due to the existence of the uneven surface, the exiting directions of surface reflected lights are different, and the transmitted reflected lights, which are incident on the reflective plate at different angles, are refracted by the uneven surface after being reflected by the reflective plate, and therefore further change their directions so that the exit angles of the transmitted reflected light are different, thus providing a better visibility.

Optionally, in some embodiments of the present disclosure, as shown in FIG. 4, the protrusions 227 and the recesses 228 in the uneven surface each have various sizes. That is, the sizes of the protrusions 227 may be different, and the sizes of the recesses 228 may also be different. This can optimize the scattering effect of the exiting light.

Figure 5:
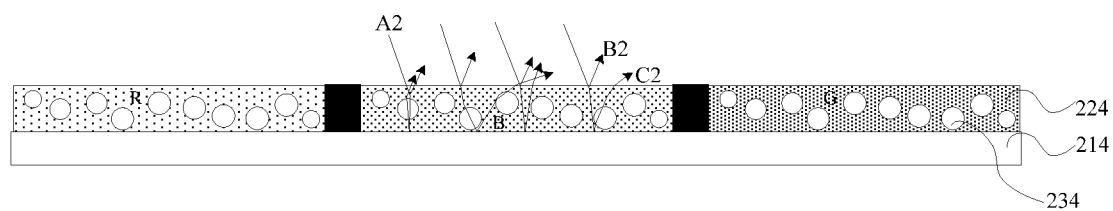
FIG. 5 schematically illustrates a structure of a scattering element according to another embodiment of the present disclosure.

FIG. 5 schematically illustrates a structure of a scattering element according to another embodiment of the present disclosure. In some embodiments, the scattering element may include scattering particles 234 within the reflective filter layer 224. As shown in FIG. 5, at least one scattering particle 234 may exist in the reflective filter layer 224. The scattering particles 234 can change the divergence direction of the exiting light to achieve the effect of light scattering.

Specifically, description is made by taking the light path of the light exiting from the blue reflective filter layer (B) as an example. After the incident light A2 reaching the blue reflective filter layer 224, a part of the blue light is reflected by the surface of the blue reflective filter layer, and leaves the blue reflective filter layer in the form of blue surface reflected light B2. Another part of the blue light is refracted into the blue reflective filter layer 224 and is reflected or further refracted by the scattering particles 234 (or refracted and reflected between the scattering particles 234). After that, this part of the blue light is reflected by the reflective plate 214, then passes through the blue reflective filter layer again, is refracted or reflected by the scattering particles 234, and finally exits as transmitted reflected light C2. The surface reflected light B2 and the transmitted reflected light C2 constitute the exiting light of the reflective filter layer 224. The transmitted reflected light has different exit directions, thus providing better visibility.

Figure 6:
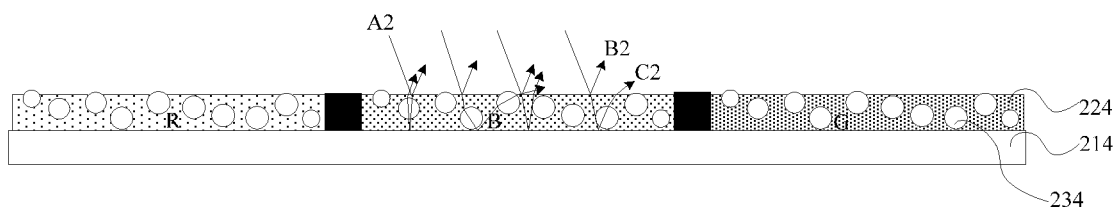
FIG. 6 schematically illustrates a structure of a scattering element according to yet another embodiment of the present disclosure.

In some embodiments, at least a part of the plurality of scattering particles protrudes from the surface of the reflective filter layer facing away from the reflective plate. FIG. 6 schematically illustrates a structure of a scattering element according to yet another embodiment of the present disclosure. As shown in FIG. 6, at least a part of the scattering particles 234 may protrude from the surface of the reflective filter layer 224 facing away from the reflective plate 214. In this way, a part of the scattering particle 234 protruding from the reflective filter layer can have the effect of reflecting the surface reflected light in different directions, and the scattering particle 234 can further change the refraction direction of the light reflected from the reflective plate 214.

In some embodiments, a refractive index of the scattering particle 234 may be different from the refractive index of the reflective filter layer 224, so that the light incident into the reflective filter layer can be refracted, thereby achieving a scattering effect.

In some embodiments, the scattering particles 234 include at least one of a spherical particle, an ellipsoidal particle, or a polyhedral particle, which is not limited herein. In addition, the sizes of the scattering particles 234 of the same shape may be the same or different, and the sizes of the scattering particles 234 of different shapes may also be the same or different, so that the light scattering is distributed within a desired angle range.

In some embodiments, the range of wavelengths transmittable through the scattering particles is the same as the range of wavelengths transmittable through the reflective filter layer where the scattering particles are located. In other embodiments, any wavelength in the visible light range is transmittable through the scattering particles. In other embodiments, the scattering particles include a first scattering particle and a second scattering particle, wherein a range of wavelengths transmittable through the first scattering particle is the same as a range of wavelengths transmittable through the reflective filter layer, and any wavelength in the visible light range is transmittable through the second scattering particle. That is, the scattering particles 234 are mixed scattering particles. In addition, the scattering particles 234 may also be opaque particles, which is not limited herein.

In some embodiments, the reflective plate 214 may be made of a metal material with high reflectivity, and can also be used as other components in the display screen. For example, the reflective plate 214 can also be used as a component such as a pixel electrode. This disclosure does not limit in this regard.

In some embodiments, the reflective pixel unit further includes a counter substrate on a side of the reflective filter layer facing away from the substrate, and a liquid crystal 203 between the counter substrate and the reflective filter layer.

According to another aspect of the present disclosure, there is provided a reflective display panel including a reflective pixel unit according to an embodiment of the present disclosure.

In some embodiments, the reflective display panel includes a plurality of reflective pixel units. The substrates of the plurality of pixel units are adjoined to form a layer of continuous substrate, and the reflective plates of the plurality of pixel units are adjoined to form a layer of continuous reflective plate. The reflective filter layers of the plurality of pixel units are arranged on the continuous reflective plate, and partition members 237 are provided between the reflective filter layers. In some embodiments, the reflective filter layers of the reflective pixel units may include a red reflective filter layer, a blue reflective filter layer, and a green reflective filter layer, respectively. In another embodiment, the reflective filter layers of the reflective pixel units may include a red reflective filter layer, a blue reflective filter layer, a green reflective filter layer, and a white reflective filter layer, respectively. In another embodiment, the reflective filter layers of the reflective pixel units may include a red reflective filter layer, a blue reflective filter layer, a green reflective filter layer, and a yellow reflective filter layer, respectively. In another embodiment, the reflective filter layers of the reflective pixel units may include a magenta reflective filter layer, a cyan reflective filter layer, and a yellow reflective filter layer, respectively. In another embodiment, the reflective filter layers of the reflective pixel units may include a magenta reflective filter layer, a cyan reflective filter layer, a yellow reflective filter layer, and a white reflective filter layer, respectively. In other embodiments, the reflective filter layers of these reflective pixel units may include reflective filter layers of other colors, which is not limited herein.

According to yet another aspect of the present disclosure, there is also provided a display apparatus including a reflective display panel according to an embodiment of the present disclosure. The display apparatus may be any product or component having a display function such as a mobile phone, a tablet computer, a television, a display, a notebook computer, a digital photo frame, a navigator, and the like.

The reflective pixel unit, the reflective display panel, and the display apparatus provided in the embodiments of the present disclosure employ a reflective filter layer and arrange the reflective filter layer on the side of the reflective plate facing away from the substrate, so that a part of the ambient light can be reflected directly by the reflective filter layer without transmitting through the reflective filter layer, thereby reducing the attenuation of light and improving display brightness. In addition, in some embodiments, the reflective filter layer has a structure that scatters light, which can avoid the degradation of the picture quality caused by the direct exposure to external light and improves the visibility of the picture.

It will be appreciated that the above embodiments are described by way of example only. Although the embodiments have been illustrated and described in detail in the drawings and the foregoing description, such illustrations and descriptions are to be considered illustrative or exemplary and not restrictive, and the present application is not limited to the disclosed embodiments.

Other variations to the disclosed embodiments can be understood and achieved by those skilled in the art when practicing the claimed subject matter, from a study of the accompanying drawings, the disclosure, and the appended claims. In the claims, the word "comprise" or "comprising" does not exclude other elements or steps, and the indefinite article "a" or "an" does not exclude plural. The mere fact that certain measures are recited in mutually different dependent claims does not indicate that a combination of these measures cannot be used to advantage. Any reference signs in the claims should not be construed as limiting the scope.

What is claimed is:

1. A reflective pixel unit, comprising:
a substrate;
a reflective plate on the substrate; and
a reflective filter layer on a side of the reflective plate facing away from the substrate,
wherein the reflective filter layer is configured such that a surface of the reflective filter layer facing away from the reflective plate receives visible light and reflects a part of light having wavelengths within a specific range in the visible light, and allows another part of the light having wavelengths within the specific range to pass through the reflective filter layer to reach the reflective plate,
wherein the reflective plate is configured to reflect the another part of the light having wavelengths within the specific range that has passed through the reflective filter layer, and
wherein the reflective filter layer comprises a scattering element.

2. The reflective pixel unit according to claim 1, wherein the scattering element comprises the surface of the reflective filter layer facing away from the reflective plate, wherein the surface of the reflective filter layer facing away from the reflective plate comprises protrusions and recesses.

3. The reflective pixel unit according to claim 2, wherein a plurality of the protrusions have a plurality of sizes, and a plurality of the recesses have a plurality of sizes.

4. The reflective pixel unit according to claim 1, wherein the scattering element comprises a scattering particle in the reflective filter layer.

5. The reflective pixel unit according to claim 4, wherein at least a part of a plurality of the scattering particles protrudes from the surface of the reflective filter layer facing away from the reflective plate.

6. The reflective pixel unit according to claim 4, wherein a refractive index of the scattering particle is different from a refractive index of the reflective filter layer.

7. The reflective pixel unit according to claim 4, wherein the scattering particle comprise at least one of a sphere particle, an ellipsoid particle, or a polyhedron particle.

8. The reflective pixel unit according to claim 4, wherein a range of wavelengths transmittable through the scattering particle is same as a range of wavelengths transmittable through the reflective filter layer.

9. The reflective pixel unit according to claim 4, wherein any wavelength within a visible light range is transmittable through the scattering particle.

10. The reflective pixel unit according to claim 4, wherein a plurality of the scattering particles comprise a first scattering particle and a second scattering particle, wherein a range of wavelengths transmittable through the first scattering particle is same as a range of wavelengths transmittable through the reflective filter layer, and wherein any wavelength within a visible light range is transmittable through the second scattering particle.

11. The reflective pixel unit according to claim 4, wherein a plurality of the scattering particles comprise a plurality of sizes.

12. The reflective pixel unit according to claim 1, further comprising:
 a counter substrate on a side of the reflective filter layer facing away from the substrate, and
 a liquid crystal layer between the counter substrate and the reflective filter layer.

13. A reflective display panel, comprising the reflective pixel unit according to claim 1.

14. The reflective display panel according to claim 13, wherein
 a plurality of the reflective filter layers of a plurality of the reflection pixel units comprise a red reflective filter layer, a blue reflective filter layer, and a green reflective filter layer, respectively, or
 a plurality of the reflective filter layers of a plurality of the reflection pixel units comprise a red reflective filter layer, a blue reflective filter layer, a green reflective filter layer, and a white reflective filter layer, respectively, or
 a plurality of the reflective filter layers of a plurality of the reflection pixel units comprise a red reflective filter layer, a blue reflective filter layer, a green reflective filter layer, and a yellow reflective filter layer, respectively, or
 a plurality of the reflective filter layers of a plurality of the reflection pixel units comprise a magenta reflective filter layer, a cyan reflective filter layer, and a yellow reflective filter layer, respectively, or
 a plurality of the reflective filter layers of a plurality of the reflection pixel units comprise a magenta reflective filter layer, a cyan reflective filter layer, a yellow reflective filter layer, and a white reflective filter layer, respectively.

15. A display apparatus, comprising the reflective display panel according to claim 13.

16. The reflective pixel unit according to claim 2, wherein a plurality of the protrusions have a plurality of sizes.

17. The reflective pixel unit according to claim 2, wherein a plurality of the recesses have a plurality of sizes.

* * * * *